July 15, 1924.
D. F. WHITING
ELECTRICAL TESTING SYSTEM
Filed Sept. 22, 1921
1,501,576
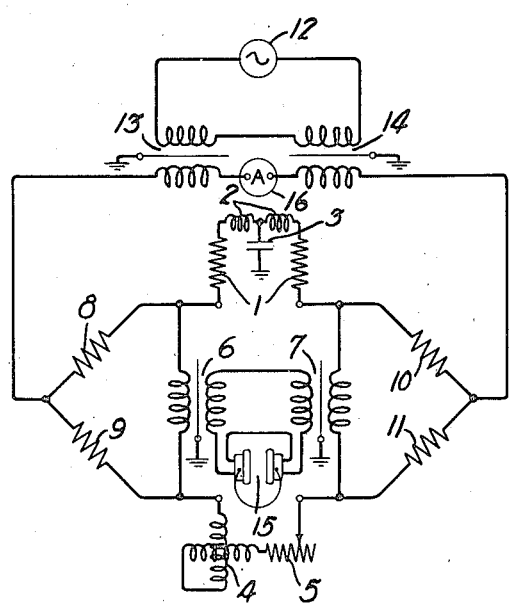
Inventor:
Donald F. Whiting
by *Jos. C. R. Palmer* Atty.

Patented July 15, 1924. 1,501,576

UNITED STATES PATENT OFFICE.

DONALD F. WHITING, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed September 22, 1921. Serial No. 502,386.

*To all whom it may concern:*

Be it known that I, DONALD F. WHITING, a citizen of the United States, residing at New York, in the county of Bronx, State of New York, have invented certain new and useful Improvements in Electrical Testing Systems, of which the following is a full, clear, concise, and exact description.

This invention relates in general to systems for making electrical measurements and more particularly to such systems for measuring the impedance of power and transmission lines or circuits.

The invention is particularly useful for accurately measuring the impedance of lines having an admittance to earth. The admittance of a line to ground becomes a greater factor as the frequency of the testing current increases. At frequencies within the range of speech or audibility, it has been found in practice that the preferred means for impressing testing current on a line comprises an oscillator and a transformer having a grounded shield. In such cases, the capacity between the transformer windings and the shield and the capacity of the line to ground ordinarily combine to alter the impedance so that inaccurate measurements result. Where the line forms one side of a phantom telephone circuit, the inaccuracy of balancing such as would result from measurements so taken, would cause interference or cross-talk between the lines.

In the present invention, a system is provided for measuring impedances in which the admittance of the circuit to ground is eliminated from the result.

Another object of the invention is to provide a system by means of which measurements of phantom circuits may be made without interference with or by the associated circuits.

One embodiment of the invention may comprise a bridge in which a detector element is arranged symmetrically with respect to the unknown impedance and balancing impedance elements, and also with respect to an energizing source of current for the bridge. More specifically, the bridge consists of two branches, each of which comprises a pair of balanced impedance elements, arranged symmetrically with respect to the unknown impedance in one arm, and the balancing or adjustable impedance in the other arm. Current is applied to the bridge from an oscillator through transformer apparatus. A pair of transformer primaries bridge the two arms about the unknown and adjustable impedances. The secondaries of these transformers are connected in series with a current detector device. Until a balance has been obtained between the unknown and the adjustable impedances, there will be a flow of the unbalance current in opposite directions through the transformers which will be indicated in the detecting instrument. Due to the symmetry of the arrangement of apparatus forming the bridge as above described, equal parts of the current flowing from the current source to the unknown impedance and returning by earth, will flow through the transformers in the same directions, their effects neutralizing each other in the detector circuit. The capacity of the unknown impedance is, therefore, eliminated as a factor in the results of the measurements.

Other objects and advantages of the invention will become apparent from the more detailed description following, taken in connection with the accompanying drawing.

The figure of the drawing illustrates one form of the invention which has been successfully used by the inventor for the measurement of impedances and is a diagrammatic representation of the apparatus employed and the circuits in which they are included.

Referring to the drawing, a line impedance is represented by resistances 1 and inductances 2. This combination of resistances and inductances will hereinafter be referred to as the unknown impedance since it is the element whose characteristics are to be determined. Associated with this unknown impedance is a capacity 3 to ground. This capacity is usually distributed uniformly throughout the length of the line but for the purposes of this description and its general effect, there is no inaccuracy in representing it as concentrated at a single point symmetrically located with respect to the resistances 1 and inductances 2.

The unknown impedance forms one side of a quadrilateral of which the opposite side is an adjustable impedance comprising an adjustable inductance 4, and an adjustable resistance 5, the range of values of these elements being comparable with the values of the unknown impedance. The other two sides of this quadrilateral are formed by the primaries of two similar transformers 6 and 7.

The primary of transformer 6 also forms one side of a three-sided arrangement of which the other two sides are two elements 8 and 9 having equal values of impedance. Similarly, the primary of transformer 7 forms one side of a three-sided arrangement of which the other two sides are two matched impedance elements 10 and 11 whose values equal those of the elements 8 and 9.

Current is applied at the junction of the elements 8 and 9, and 10 and 11, from a source 12 of alternating or pulsating current, through transformers 13 and 14. The transformers 13 and 14 are connected in series aiding, and are of the grounded shield type.

The secondaries of transformers 6 and 7 are connected in series with a telephone receiver 15 or other current detector depending upon the current frequency employed. The currents flowing through transformers 6 and 7 are of the same magnitude and when these currents are in the same direction will, therefore produce no effect in the current detector. Currents flowing in opposite directions through these transformer primaries produce an effect which will be indicated in the receiver 15.

The current source 12 may be of any desired type, that preferred by the inventor being a vacuum tube oscillator well known in the art which may be tuned to any desired frequency.

As stated above, this system is particularly adapted for measuring impedances at high frequencies, such as occur in speech transmission and radio systems. With current of these frequencies, there will be an appreciable capacity effect between the transformer windings and the grounded shield which furnishes a ground path for current to the unknown impedance through the capacity 3.

Some of the current taking this ground path will flow from the unknown impedance through the primaries of transformers 6 and 7, but being in the same direction, will not produce any effect in the receiver 15.

Unless the unknown impedance and the adjustable impedance are equal, unbalance current will flow in the primaries of transformers 6 and 7 in oposite directions causing an indication thereof in the receiver 15. A balance may, therefore, be obtained by a proper adjustment of the inductance 4 and the resistance 5. After a balance is obtained the value of the unknown impedance may be computed from the values of elements 4 and 5.

A current indicator 16 indicates the amount of current which is impressed upon the bridge.

The transformers 13 and 14 have been described above as independent structures. This is most convenient in the diagrammatic illustration, but in practice these transformers are mounted on a single core and the primaries are a single winding. Similarly the secondary windings of transformers 6 and 7 are in practice a single winding mounted on a single core with both primaries.

In describing the operation and theory of this bridge, it has been assumed that there is actually a flow of current through the primaries of transformers 6 and 7, through the capacity 3, to earth and thence to the transformers 13 and 14. There is no inaccuracy resulting from such an assumption and this is an artifice commonly resorted to in analyzing networks. As a matter of fact there is no flow of current in these paths since the point at which the capacity 3 is connected is located symmetrically with respect to the source of current energizing the bridge, and this point is, therefore, of zero potential relative thereto. It is, therefore, self-evident that an element or network of any desired character may be substituted for capacity 3 without disturbing the conditions as above described. This is actually the case when the unknown impedance comprises either the side circuit of a phantom line or a circuit simplexed to ground. One advantage of the use of this system is due to this fact since the side circuits, the phantom circuits, or the simplexed circuit may be tested individually, and absolutely no interference occurs with the associated networks or with the bridge from the associated networks.

It has also been stated that the impedances 8, 9, 10 and 11 should be equal. This is preferable, but not necessary. the impedances 8 and 10 should always be equal to preserve the symmetry. Likewise impedances 9 and 11 should be equal. A balance may be obtained if the unknown and adjustable impedances are in the same ratio to each other as the impedances 8 and 9, or 10 and 11.

What is claimed is:

1. In an electrical impedance measuring bridge, an unknown impedance, an adjustable impedance comparable with the unknown impedance, a pair of transformers associated with the unknown and the adjustable impedances, a current detector associated with the transformers, a terminal for each transformer and symmetrically located with respect to the ends thereof, and a source of variable current for connection with said terminals.

2. In an electrical impedance measuring bridge, a source of variable current, a plurality of similar impedance elements associated therewith, a pair of transformers each of which is bridged between certain of said impedance elements, a current detector associated with said transformers, and an unknown impedance and an adjustable impedance comparable therewith arranged symmetrically with respect to said impedance elements.

3. A testing bridge having an unknown impedance, an adjustable impedance, a source of current, a current detector, means associating the unknown and adjustable impedances with the current detector, and a plurality of current paths including known impedances associating the source of current with said means.

4. A testing bridge having an unknown impedance, an adjustable impedance, a source of current, a current detector, a pair of transformers associating the unknown and adjustable impedances with the current detector, and a plurality of current paths including similar known impedances associating the source of current with said transformers.

5. In a testing bridge, a quadrilateral arrangement of an unknown impedance, an adjustable impedance and two transformers, a current detector associated with both said transformers, a known impedance connected with each junction of the elements of the said quadrilateral arrangement, and a source of current associated with the known impedances in pairs.

6. In a testing bridge, a quadrilateral arrangement of an unknown impedance, an adjustable impedance and two non-adjacent transformers, a current detector associated with both said transformers, a known impedance connected with each junction of the elements of the said quadrilateral arrangement, and a source of current associated with the known impedances in pairs connected at adjacent junctions of the said quadrilateral.

7. An impedance measuring bridge, comprising terminals for connection to a source of alternating current, an impedance to be measured which is located symmetrically with respect to said terminals, an adjustable impedance also located symmetrically with respect to said terminals, transformer means associated with the unknown and adjustable impedances, and current indicating means associated with the transformer means.

8. An impedance measuring bridge, comprising terminals for connection to a source of alternating current, an unknown impedance located symmetrically with respect to said terminals, an adjustable impedance also located symmetrically with respect to said terminals, a pair of transformers associating the unknown and adjustable impedances, and current indicating means associated with said transformers.

9. An impedance measuring bridge for lines having an admittance to ground, comprising a pair of terminals, a source of alternating current, shielded transformer means associating said source with the terminals, the shielding of said means being grounded and in condensive relation with the winding of said means, a line of unknown impedance located symmetrically with respect to said terminals, said line having an admittance to ground, an adjustable impedance also located symmetrically with respect to said terminals, transformer means associated with the unknown and adjustable impedances, and current indicating means associated with the transformer means, whereby no portion of the current from said source passes through said admittance to ground.

10. An impedance measuring bridge for lines having an admittance to ground, comprising a pair of terminals, a source of alternating current, shielded transformer means associating said source with the terminals the shielding of said means being grounded and in condensive relation with the winding of said means, a line of unknown impedance located symmetrically with respect to said terminals, said line having an admittance to ground, an adjustable impedance also located symmetrically with respect to said terminals, transformer means associated with the unknown and adjustable impedances, and current indicating means associated with the transformer means whereby no portion of the current from said source passes through said admittance to ground.

In witness whereof, I hereunto subscribe my name this 20th day of September, A. D. 1921.

DONALD F. WHITING.